United States Patent
Brown et al.

(10) Patent No.: US 7,257,086 B2
(45) Date of Patent: *Aug. 14, 2007

(54) METHOD AND SYSTEM FOR EFFECTUATING NETWORK ROUTING OVER PRIMARY AND BACKUP CHANNELS

(75) Inventors: Robert Allen Brown, Seattle, WA (US); Carl Andrew Brannen, Redmond, WA (US); Randy William Lee, Kirkland, WA (US)

(73) Assignee: Terabeam Corporation, San Jose, CA (US)

( * ) Notice: Subject to any disclaimer, the term of this patent is extended or adjusted under 35 U.S.C. 154(b) by 1079 days.

This patent is subject to a terminal disclaimer.

(21) Appl. No.: 10/228,557

(22) Filed: Aug. 27, 2002

(65) Prior Publication Data

US 2004/0042396 A1 Mar. 4, 2004

(51) Int. Cl.
*H04L 12/56* (2006.01)
(52) U.S. Cl. .......................... 370/242; 370/228; 398/5
(58) Field of Classification Search ................ 370/216, 370/225, 227, 228, 242; 398/1, 5, 27, 118
See application file for complete search history.

(56) References Cited

U.S. PATENT DOCUMENTS 5,387,902 A * 2/1995 Lockyer et al. ............. 370/225

6,678,251 B2 * 1/2004 Sowizral et al. ............ 370/242
7,012,897 B1 * 3/2006 Sowizral et al. ............ 370/242

OTHER PUBLICATIONS

Filer et al., "Programmable Controllers and Designing Sequential Logic", 1992, Saunders HBJ Publisher, ISBN 0-03-032322-3, selected pages.*

* cited by examiner

*Primary Examiner*—Hassan Kizou
*Assistant Examiner*—Brian T O'Connor
(74) *Attorney, Agent, or Firm*—Townsend and Townsend and Crew LLP

(57) ABSTRACT

A method and system for effectuating network routing over primary and backup channels. In one embodiment, a primary link is enabled to transfer customer traffic between network nodes, while a transmission quality of the link is monitored. Upon determining the primary link has entered a marginal state, the primary link is disabled such that the network immediately determines it is unavailable. Test traffic is sent over the primary link while monitoring the transmission quality to determine if the link returns to a non-marginal state, and in response thereto the primary link is re-enabled such that the network immediately determines it is available for routing customer traffic again. In one embodiment, rerouting the customer traffic is effectuated by opening and closing the primary link, such that it appears to the network to be disconnected and reconnected. In one embodiment, the primary link comprises a free space optical (FSO) link.

3 Claims, 7 Drawing Sheets

| LOD State | Status of Network-side PHY |
|---|---|
| OKDATA | ON |
| DELAY | ON |
| NODATA | OFF |
| HOLDOFF | OFF |

METHOD AND SYSTEM FOR EFFECTUATING NETWORK ROUTING OVER PRIMARY AND BACKUP CHANNELS

BACKGROUND OF THE INVENTION

1. Field of the Invention

The present invention generally relates to computer networks, and, more specifically, to a method and system for routing communication traffic over primary and backup communication channels. In one embodiment the primary channel comprises a free-space optical (FSO) communications systems link

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or fibers between locations. Wireless optical communications are also known as free-space optical (FSO) or atmospheric optical communications. In a typical free-space optical communication system, a modulated beam of light is directed through free-space from a transmitter at a first location to a receiver at a second location. Data or information is encoded into the beam of light by means of the modulation. Once received by the receiver, the modulated beam of light is demodulated and corresponding data and information may then be extracted. This scheme enables data and information to be transmitted through free-space from the first location to the second location.

Transmission of optical signals through free space poses many challenges. Since the atmosphere is the propagation medium for FSO transmissions, various weather conditions, such as fog, can greatly degrade signal strength and link distances. In some instances, the conditions are such that the use of an optical link is temporarily unavailable. Under these conditions, it is common to switch to a backup "land-line" network link, such as a T1 telecommunications link, to maintain the communication channel. Generally, the backup link will only provide a fraction of the bandwidth available with the optical link. As a result, it is desired to use the primary (optical) link whenever possible. However, it is also very important that data losses be kept to a minimum.

In a typical FSO system, a distribution switch or the like is used to reroute communication traffic to a backup link when routing via an optical link is not possible. Conventionally, this may be done by monitoring handshaking signals, such as Open Shortest Path First (OSPF) "hello" packets, or monitoring other optical link performance characteristics, such as dropped packets. For example, when an insufficient number of "hello" packets are received, the distribution switch may reroute the communication traffic to the backup link. In some instances, the optical link may enter a marginal operating state. In this state, a sufficient number of "hello" packets may be received to keep a route active, but high link-error rates and their resulting re-transmission of data packets significantly degrades link bandwidth for customer data. This situation may lead to network "flapping," which describes a condition in which the optical link goes in and out of tolerance and the distribution switch and other network devices used for routing traffic have to excessively reconfigure their routing tables in response to each routing switch to maintain the communications link. This may lead to a large percentage of the network bandwidth being unavailable for the communication traffic.

SUMMARY OF THE INVENTION

The present invention provides a method and system for effectuating network routing over primary and backup channels. In one embodiment, a primary link is enabled to transfer customer traffic between network nodes, while a transmission quality of the link is monitored. Upon determining the primary link has entered a marginal state, the primary link is disabled such that the network immediately determines it is unavailable. Test traffic is then sent over the primary link while monitoring the transmission quality to determine if the link returns to a non-marginal state, and in response thereto the primary link is re-enabled such that the network immediately determines it is available for routing customer traffic again. In one embodiment, rerouting the customer traffic is effectuated by opening and closing the primary link, such that it appears to the network to be disconnected and reconnected. In one embodiment, the primary link comprises a free space optical (FSO) link. According to additional aspects of the invention, a state-machine based algorithm is implemented to prevent network flapping.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Embodiments of a method and system for effectuating network routing over primary and backup channels are described herein. In the following description, numerous specific details are disclosed to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments of the invention disclosed herein may be implemented in point-to-point free-space optical communications systems wherein an optical link is facilitated by an optical transmitter to a receiver. The transmitter and receiver may be located at the same location or at different locations such as on different buildings within a line of sight of each other. It is appreciated that the transmitter and the receiver may be parts of transceivers, or transmitter-receiver combinations, at their respective locations, such that bi-directional communications are provided. The transmitter includes an optical source that generates an optical communications beam, such as a laser beam or the like, on which data or information is modulated. The optical communications beam is not limited to being monochromatic or to any particular wavelength or color and may include the visible light as well as ultra violet or infra-red portions of the spectrum.

Figure 1A:
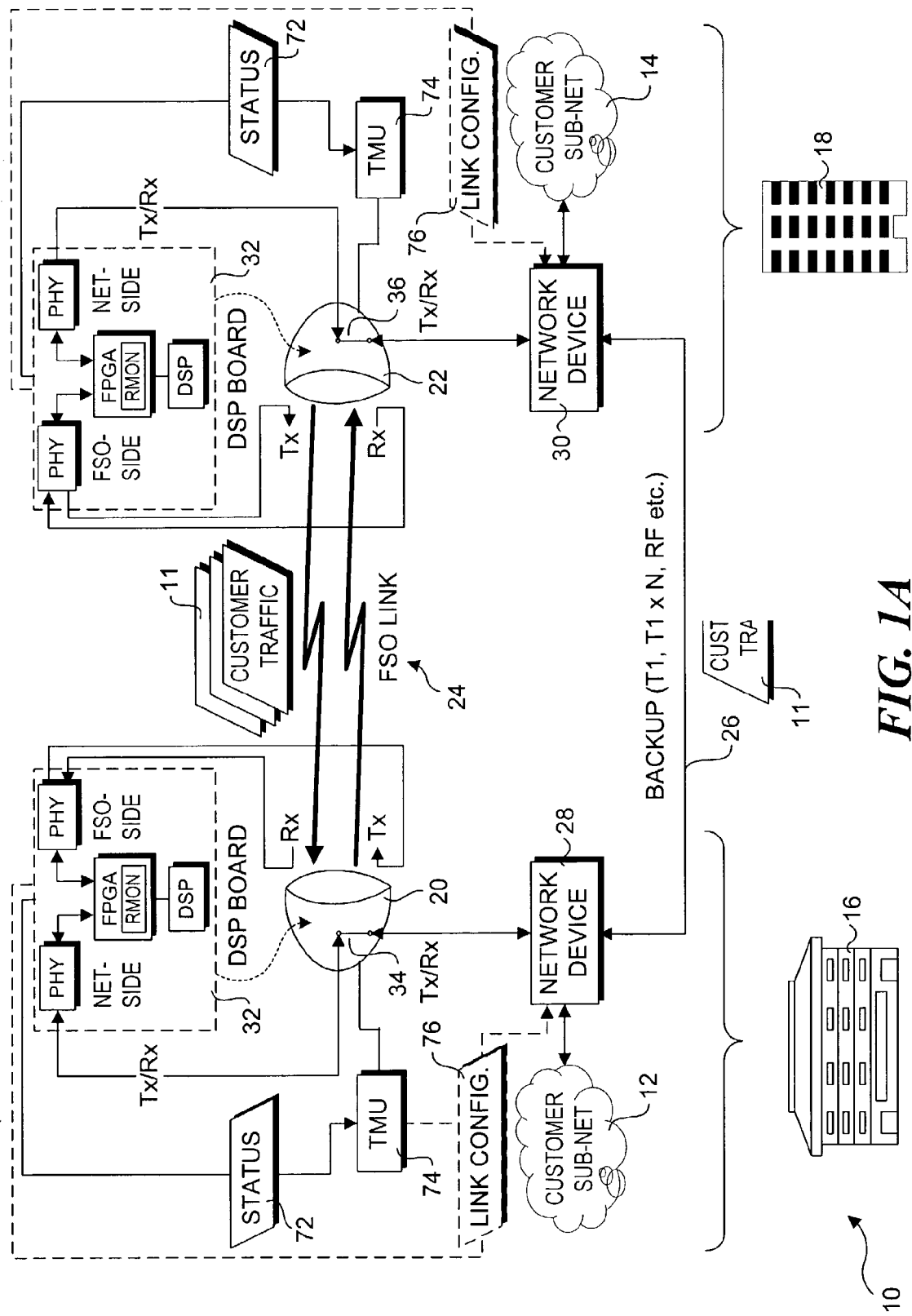
FIG. 1A is a schematic diagram corresponding to one embodiment of a Free Space Optical (FSO) communications system that may be used to implement various aspects of the present invention, wherein an primary channel comprising an FSO link is enabled.
Figure 1B:
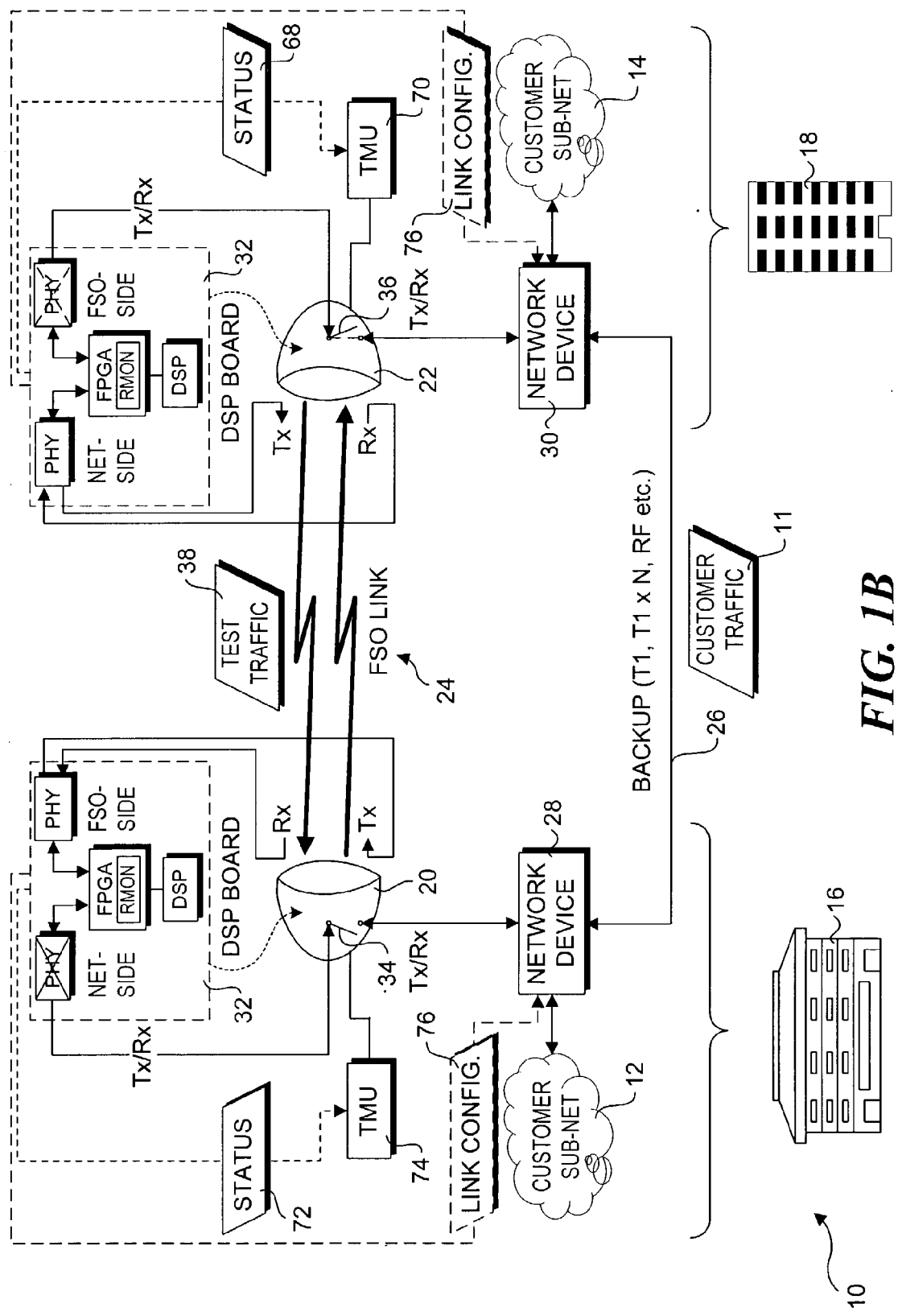
FIG. 1B is a schematic diagram of the FSO communications system of FIG. 1A, wherein the FSO link is disabled.

A high-level view of an FSO system 10 in accordance with one embodiment of the invention is shown in FIGS. 1A and 1B. The objective of FSO system 10 is to transfer data (identified as "customer traffic" 11) between a customer sub-network (sub-net) 12 and a customer sub-net 14. Typically, each of customer sub-nets 12 and 14 will be located in separate respective buildings 16 and 18. FSO system 10 further includes a pair of FSO transceiver "heads" 20 and 22 that are respectively located at buildings 16 and 20, which are implemented to enable an FSO link 24.

Preferably, data transfers between the two sub-nets should use the highest bandwidth transfer path(s) available at the time. In the illustrated embodiment, these transfer paths include a primary channel comprising FSO link 24 and a backup channel 26. Generally, the primary channel, such as FSO link 24, will have an operational bandwidth much greater than the backup channel(s). For example, FSO link may have a bandwidth of 100 megabits per second (Mbps), while the backup channel will typically comprise one or more T1 lines (1.5 Mbps each), a radio frequency (RF) link, a combination of network links, etc.

In accordance with well-known network principles, network devices, such as network routers, network switches and the like, are used to automatically route data between network nodes (e.g., customer sub-nets 12 and 14) in a manner that aims to maximize data transfer rates across those nodes. Such network devices are collectively depicted in FIGS. 1A and 1B by network devices 28 and 30. For example, in typical network infrastructures, network routers "choose" transfer paths based on routing configuration table information stored in each router. This information may include both predefined (static) and dynamically-updated information. When a network router detects that a particular route is filled with traffic (i.e., a bandwidth saturation condition) or that a particular gateway is dead, the router will attempt to reroute the traffic along another transfer path. Generally, routing information will be generated by a routing protocol operating on top of the transmission medium layer, such as the Routing Information Protocol (RIP) and Open Shortest Path First protocol (OSPF) internal gateway protocols and the Border Gateway Protocol (BGP) external gateway protocol. RIP is a broadcast-based protocol used primarily on small- to medium-sized networks. The more sophisticated OSPF protocol is used for medium to large networks. BGP-4 (RFC 1771), which is the current de facto exterior routing protocol on the Internet, implements intelligent routing selection based on most specific prefix and shortest Autonomous System (AS) path. Other routing protocols exist as well. In general, each of these protocols notify other routers that support the protocols of the networks they are attached to and of any changes that occur due to links being disconnected (opened) or becoming too congested to efficiently pass traffic.

For example, OSPF is a link-state protocol that operates in the following manner. Consider a link as being an interface on a router. The state of the link is a description of that interface and of its relationship to its neighboring routers. A description of the interface would include, for example, the IP address of the interface, the network mask, the type of network it is connected to, the routers connected to that network and so on. The collection of all these link-states form a link-state database.

Under OSPF, when a network topology change occurs (e.g., an existing link goes down or a new link is added), the affected routers will generate a link-state advertisement. This advertisement will represent the collection of all link-states on those routers. The routers for a given AS will exchange link-states by means of flooding: each router that receives a link-state update should store a copy in its link-state database and then propagate the update to other routers. After the database of each router is completed, the router will calculate a shortest path tree to all destinations using the Dijkstra algorithm. The destinations, the associated costs, and the next hop to reach those destinations will be used to form the IP routing table for each router.

The shortest path is calculated using the Diskjtra algorithm. The algorithm places each router at the root of a tree and calculates the shortest path to each destination node based on the cumulative cost required to reach that destination (i.e., an aggregation of the costs for each link along a particular transfer path). Each router will have its own view of the topology even though all the routers will build a shortest path tree using the same link-state database.

The cost (also called metric) of an interface in OSPF is an indication of the overhead required to send packets across a certain interface. The cost of an interface is inversely proportional to the bandwidth of that interface. For instance, there is more overhead (higher cost) and time delays involved in crossing a 56 k serial line than crossing a 10M Ethernet line. The formula used to calculate the cost is:

cost=10000 0000/bandwith in *bps*.

For example, it will cost 10 EXP8/10 EXP7=10 to cross a 10M Ethernet line and will cost 10 EXP8/1544000=64 to cross a T1 line. By default, the cost of an interface is calculated based on the bandwidth of the link. You can also force the cost of an interface by using the "ip ospf cost<value>" interface subcommand.

In order to build the shortest path tree for a given router, we make that router the root of the tree and calculate the smallest aggregated cost for each destination node. After the router builds the shortest path tree, it will start building the routing table accordingly. Directly connected networks will be reached via a metric (cost) of 0 and other networks will be reached according to the cost calculated for the transfer paths to those networks, as defined by the shortest path tree.

Returning to FIG. 1A, assume that FSO link 24 has a bandwidth of 100 Mbps, and Backup link 26 has an average bandwidth of 4.5 Mbps (e.g., 3 T1 lines), and assume that network devices 24 and 26 are OSPF routers. Further assume that both FSO link 24 and backup channel 26 are up (i.e., operational), as shown in FIG. 1A. Under this configuration, the cost of FSO link 24 will be 10 EXP8/10 EXP7=1 and the cost of backup channel 26 will be 10 EXP8/1544000*3=21.6 Since the cost of FSO link 24 is much less than the cost of backup channel 26, the preferred routing path will be via the FSO link. Under practice, it is likely that both the FSO link and the backup channel will be used, with the majority of customer traffic 11 being routed over the higher-bandwidth FSO link, as illustrated in FIG. 1A.

Another function provided by most modern network devices architectures is the ability to detect when a link is "broken." For example, if a network cable becomes disconnected, any link including the network cable is broken, which is instantly recognized by any network devices connected to the link. In response to detecting such a condition, the network devices will automatically update their routing configuration information so as to no longer attempt to route traffic over the broken link.

In accordance with aspects of the invention, FSO system 10 leverages the automatic routing and broken-link detection capabilities of today's network devices to efficiently reroute customer traffic along alternate routes when the operation of a primary channel, such as FSO link 24, becomes marginal. In one embodiment, such customer traffic routing is effectuated via a state-based Loss of Data (LOD) algorithm running on respective Digital Signal Processing (DSP) boards 32. As described below in further detail, the LOD algorithm is used to "open" FSO link 24 when a marginal link operating condition is detected, and to "close" the FSO link when the operating state of the link is determined to have returned to a non-marginal operating condition. This opening and closing of the link is depicted via the position of switches 34 and 36 in FIGS. 1A (closed) and 1B (open).

Figure 2:
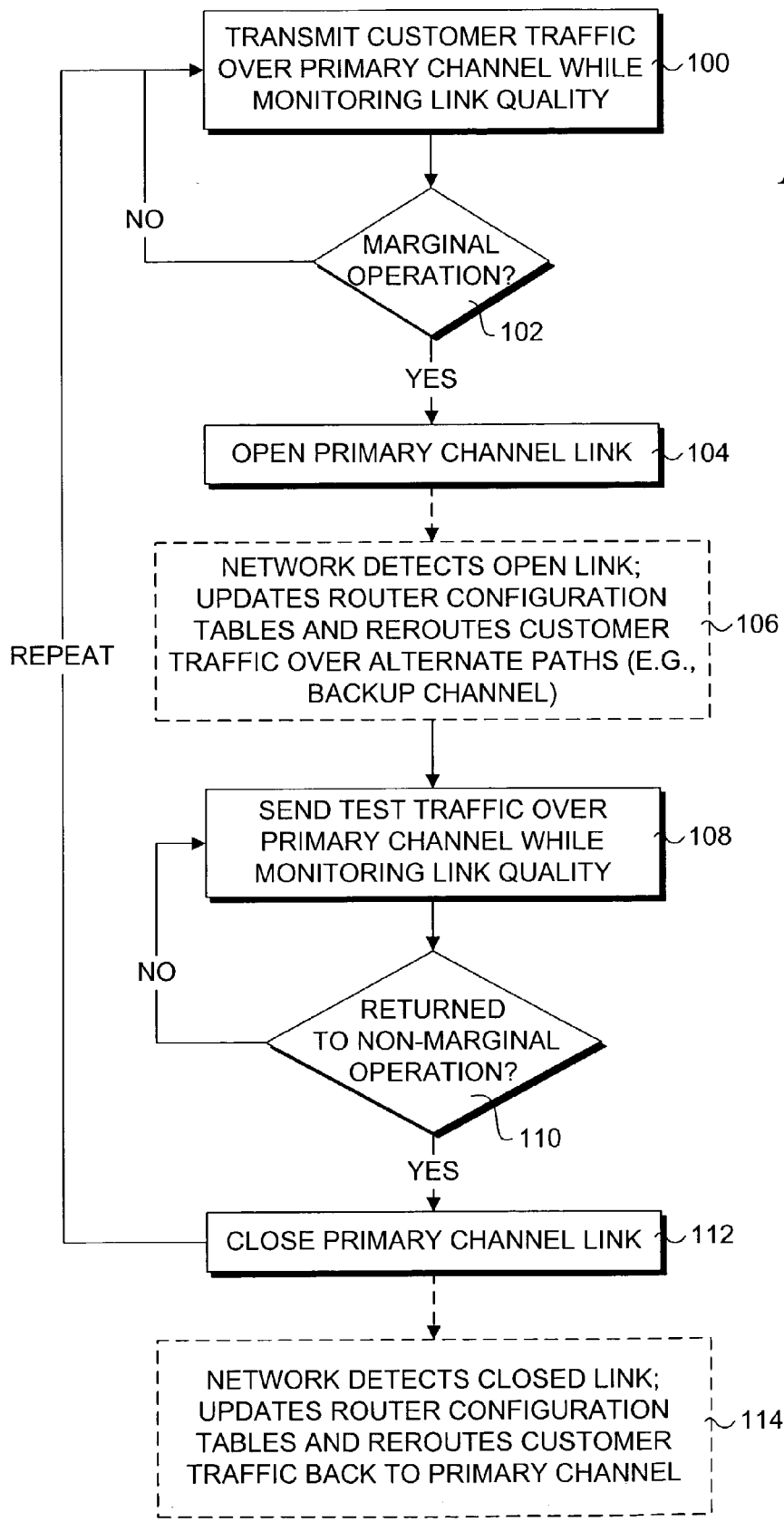
FIG. 2 is a flowchart illustrating the operations and logic implemented by one embodiment of the invention to effectuate routing of data when a primary channel link is enabled or disabled.

With reference to the flowchart of FIG. 2 and FIGS. 1A and 1B, network rerouting is effectuated in the following manner. Initially, suppose that FSO link 24 is operating under normal (non-marginal) conditions, as depicted in FIG. 1A, wherein switches 34 and 36 are shown in closed positions. Furthermore, suppose the bandwidth of FSO link 24 is significantly greater than the bandwidth of backup channel 26. Under this condition, the majority (if not all) of customer traffic 11 is routed over FSO link 24 (the primary channel), in accordance with a block 100 in the flowchart of FIG. 2. During this same time, the quality of the link is monitored to determine if the link enters a marginal operating condition, as explained below in further detail. In accordance with a decision block 102, customer traffic continues to be routed over the primary channel until a marginal link condition is detected.

In response to detection of a marginal link condition, the logic proceeds to a block 104 in which the primary channel link is opened. This condition is depicted in FIG. 1B, wherein switches 34 and 36 are depicted as open (in practice, only one of switches 34 or 36 would need to be open to cause an open link condition). The open condition of the primary channel link is immediately detected by any network devices that are connected to the link, e.g., network devices 28 and 30, as indicated by a block 106. (It is noted that the blocks having dashed lines indicate operations performed by network components that are not integral to FSO system 10; furthermore, the specific network components, configuration, and routing protocols are transparent to the operations of FSO system 10). In response to the open link condition, the network devices will update their network routing configuration information and advise other routers of changes in the network topology such that appropriate routers are informed that the link is not currently available. For example, under OSPF, network devices 28 and 30 will update their link-state databases, and flood the updated link-state data to other routers on the network. Furthermore, this updated link-state information is used to reconfigure the network devices' routing tables such that customer traffic 11 is rerouted along one or more alternate transfer paths (e.g., over backup channel 26). In general, all of the operations in block 106 are automatically handled by the network devices, and are independent of the particular routing protocol(s) being used.

In conjunction with opening the primary channel link, test traffic is sent over the closed portion of the primary channel link (e.g., FSO link 24 while monitoring the link quality), as provided by a block 108. As explained below, in one embodiment this test traffic comprises sending an "idle" pattern over the primary channel link. During this time, the transmission quality is monitored via the LOD algorithm to determine if the link returns to a non-marginal operating state. In accordance with a decision block 110, upon this determination, the appropriate switch(es) 34 and/or 36 will then be closed, bringing the primary channel FSO link back up. As indicated in a block 114, the applicable network devices (e.g., network devices 28 and 30) immediately detect that the link is back up and update their link-state databases and routing tables (e.g., under OSPF). As a result, the majority (if not all) of the customer traffic is rerouted back to the primary channel, returning the routing state back to its initial state corresponding to block 100. The operations of the flowchart are then repeated on an ongoing basis.

Figure 3:
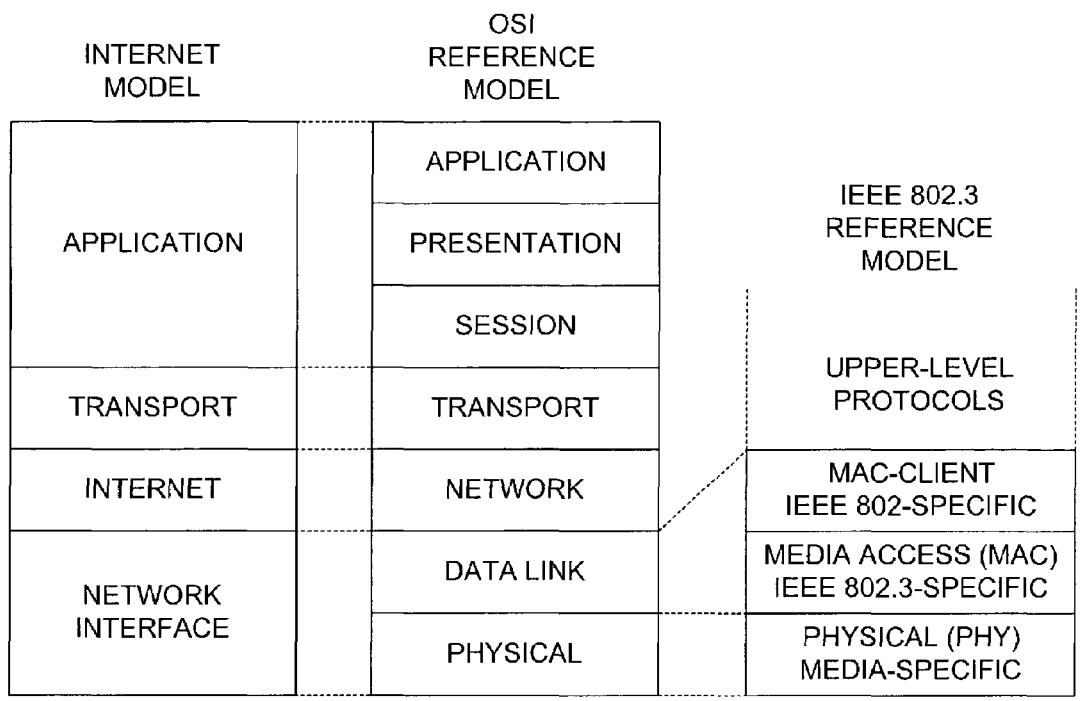
FIG. 3 is a schematic block diagram illustrating respective multi-layer protocol stacks corresponding to the Internet model, the OSI reference model and the IEEE 802.3 (Ethernet) reference model.

In general, transmission of information of modern computer networks is enabled through a multiplayer architecture, such as defined by the Internet model, OSI (Open Systems Interconnection) reference model, and IEEE 802.3 (Ethernet) reference model shown in FIG. 3. Under the OSI reference model, the lowest level in the architecture is called the Physical layer. This layer, also known as "L1," is the only layer that is truly connected to the network in the sense that it is the only layer concerned with how to interpret the voltage on the network cables (i.e., the 1s and 0s). This layer also corresponds to the Physical (PHY) layer under the IEEE 802.3 Ethernet reference model.

The second layer under OSI is the Data Link Layer. This layer is responsible for the creation and interpretation of different frame types based on the actual physical network being used. For instance, Ethernet and token-ring networks support different and numerous frame types, and the Data Link layer must understand the difference between them. This layer is also responsible for interpreting what it receives from the Physical layer, using low-level error detection and correction algorithms to determine when information needs to be re-sent. Network protocols, including the TCP/IP protocol suite, do not define physical standards at the physical or Data Link layer, but instead are written to make use of any standards that may currently be in use. The boundary layer in between the Data Link layer and the Network layer defines a group of agreed-upon standards for how protocols communicate and gain access to these lower layers. As long as a network protocol is appropriately written to this boundary layer, the protocols should be able to access the network, regardless of what media type is used. Under the IEEE 802.3 model, the OSI Data Link layer corresponds to the MAC (Media Access Control) layer and the MAC-client layer. Under the Internet model, the Physical and Data Link OSI layers correspond to the Network Interface layer.

The third layer of the OSI model is the Network layer. This layer is primarily associated with the movement of data by means of addressing and routing. It directs the flow of data from a source to a destination, despite the fact that the machines may not be connected to the same physical wire or segment, by finding a path or route from one machine to another. A number of protocols from the TCP/IP protocol suite exist in this layer, but the network protocol that is responsible for routing and delivery of packets is the IP protocol.

The fourth OSI layer is the Transport Layer. This layer is primarily responsible for guaranteeing delivery of packets transmitted by the Network layer, although this isn't a strict requirement. Depending on the protocol used, delivery of packets may or may not be guaranteed. When guaranteed delivery is required, TCP is used; otherwise, UDP (User Datagram Protocol) may be used.

Under conventional techniques for determining the operating condition of a link, higher-level protocols such as TCP/IP are used. For example, modern network devices typically determine the availability and operation of network links using TCP/IP "hello" packets, or employ similar techniques. For example, the network devices may monitor a percentage of dropped "hello" packets for the various network links, and if the percentage exceeds an error-rate threshold the link is identified as faulty or otherwise is marked as disabled by the network. In contrast, in accordance with the present invention, network link operability is determined through error checking at the Physical layer. Generally, link operability detection at the Physical layer provides enhanced accuracy when compared with the conventional techniques that are performed at higher layers. Furthermore, in accordance with aspects of the invention, link operability detection at the Physical layer is performed in a real-time manner; in contrast, the conventional techniques determine a link operating condition that is somewhat delayed, since information on dropped "hello" packets or the like have to be sent back from a receiving routing devices to the routing devices that originally sent them.

Figure 4:
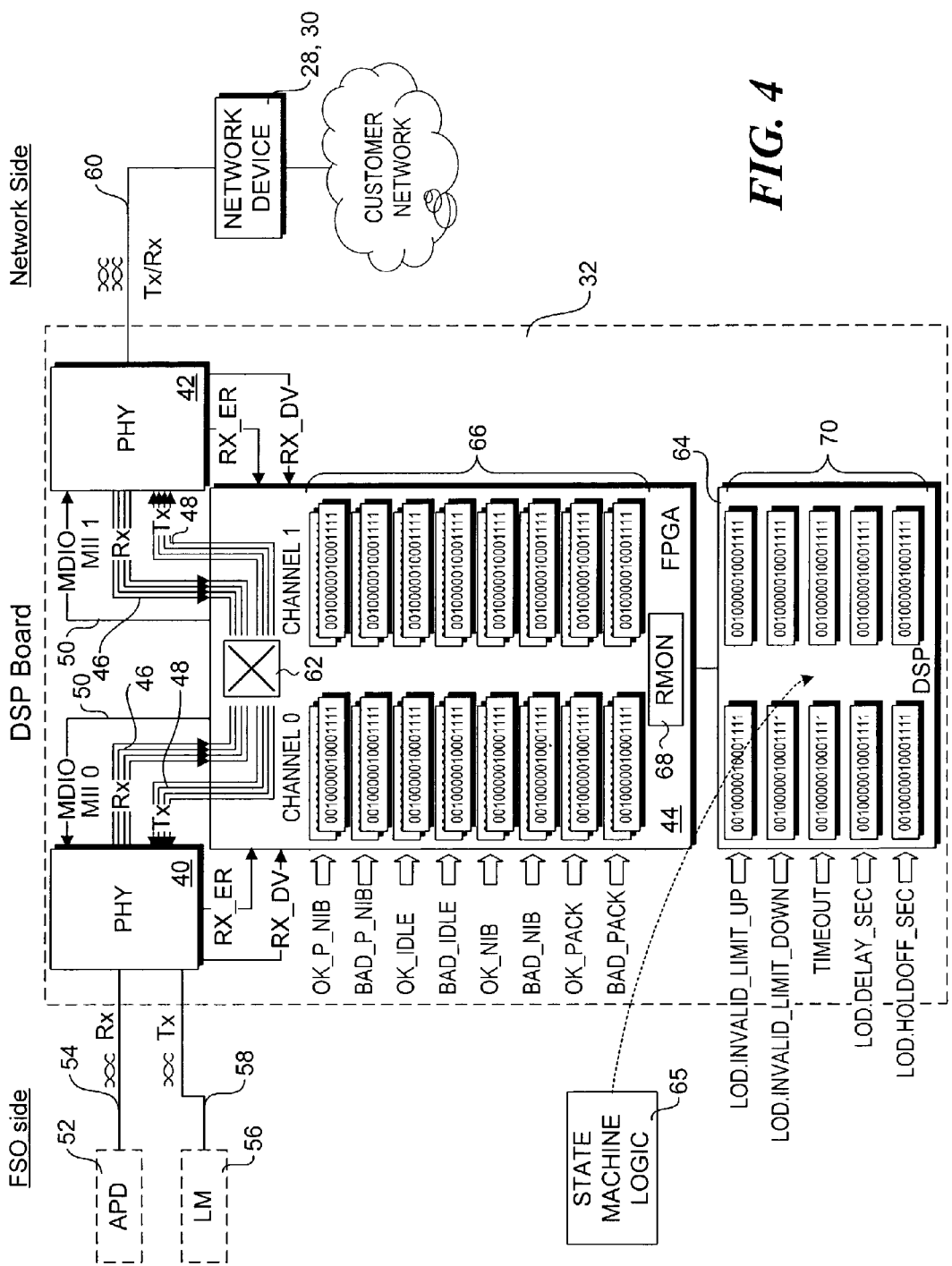
FIG. 4 is a schematic diagram illustrating details of a DSP (digital signal processor) board used to implement various aspects of the invention.

In one embodiment, this error checking information as automatically determined DSP board 32, further details of which are shown in FIG. 4. DSP board 32 includes two Ethernet transceiver integrated circuit chips 40 and 42, also referred to herein as "PHY" (i.e., Physical layer) chips. PHY chips are common to devices that provide Physical layer Ethernet interfaces, such as NIC's (network interface cards) and various other types of Ethernet interface equipment. In one embodiment, PHY chips 40 and 42 comprise Advanced Micro Devices model Am79C874 Ethernet transceiver chips.

Each of PHY chips 40 and 42 is connected to a Field Programmable Gate Array (FPGA) 44 via a plurality of input output (I/O) lines, including receive (Rx) data lines 46, and transmit (Tx) data lines 48. Corresponding Rx, and Tx signals are provided to and received from the PHY chips based on a standard IEEE 802.3u Media Independent Interface (MII) employed by the chips; these signals are divided into signals corresponding to MII channels 0 and 1 corresponding to respective PHY chips 40 and 42. MII management operations are enabled via a MDIO (Management Data Input/Output) interface signal 50.

On the FSO-side, a differential received signal Rx generated by an avalanche photo detector (APD) 52 is received at Rx+ and Rx− input pins on PHY chip 40 via a cable 54 (e.g., twisted pair), while a differential a transmit signal Tx output at pins Tx+ and Tx− is sent to a Laser Module (LM) 56 via a cable 58. The transmit signal is then processed by LM 56 to generate the outbound FSO optical transmission signal. Generally, on the Network-side, the differential receive and transmit signals (Tx/Rx) will be carried over a single Ethernet cable 60, connecting PHY 42 to Network device 28 or 30, as applicable.

A FIFO-based "clock domain crossing circuit" 62 is implemented via programmed gate logic in the FPGA to effectively cross connect incoming Rx signals with outgoing Tx signals and vice-versa. In brief, the clock domain crossing circuit matches the frequency between each Rx-Tx pair by adding or removing idle bits, thereby enabling signals from one of PHY chips 40 and 42 to be (effectively) directly passed to the other PHY chip. The end result is that from the network's standpoint the signals received by and generated at the FSO side of PHY chip 40 appear to be directly coupled to network devices 28 and 30 when both PHY chips 40 and 42 are enabled.

Overall, the components and operations of DSP board 32 are managed by a DSP 64. Optionally, other types of processors may be used for this operation, including microprocessors, embedded processors, micro-controllers, and the like. In addition to the components illustrated in FIG. 4, the DSP board may include other circuitry and programmed logic (not shown) for performing other functions pertaining to FSO links and/or FSO transceiver operations. The DSP is also used to execute state machine logic 65 corresponding to the state machine LOD algorithm discussed below.

Figure 5:
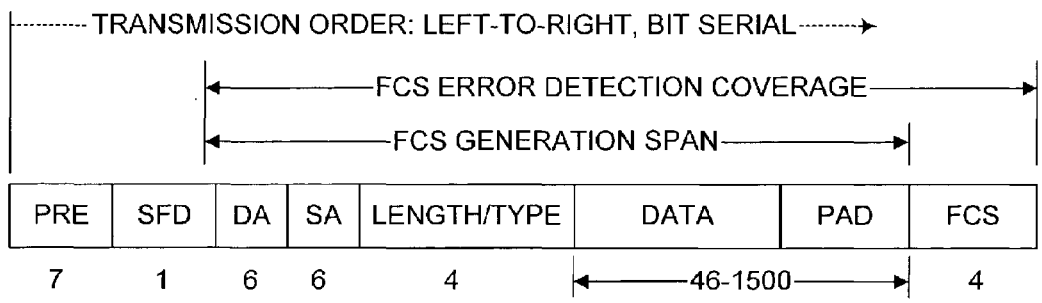
FIG. 5 is a diagram depicting fields in a basic Ethernet frame.

As discussed above, in one embodiment, error-checking is performed at the Physical layer to determine if the link is operating in a marginal or non-marginal operation state. In one embodiment, the Physical layer corresponds to IEEE 802.3 Ethernet standard. The IEEE 802.3 standard defines a basic Ethernet data frame format that is required for all MAC implementations, plus several additional optional formats that are used to extend the protocol's basic capability. As shown in FIG. 5, the basic frame begins with a 7-byte preamble (PRE) followed by a 1-bit start-of-frame (SOF) delimiter. The PRE is an alternating pattern of ones and zeros that tells receiving stations that a frame is coming, and that provides a means to synchronize the frame-reception portions of receiving physical layers with the incoming bit stream. The next two fields, DA and SA, contain the 6-byte destination and source addresses, respectively. The 4-byte Length/Type field indicates either the number of MAC-client data bytes that are contained in the data field of the frame, or the frame type ID if the frame is assembled using an optional format. If the Length/Type filed value<=1500, the number of LLC bytes in the Data field is equal to the Length/Type field value; if greater than 1536, the frame is an optional type frame, and the Length/Type field value identifies the particular type of frame being sent or received.

The next field is the Data field. The Data field comprises a sequence of n bytes of any value, wherein n<=1500. If the length of the Data field is less than 46 bytes, the Data field must be extended by adding a Pad sufficient to bring the Data field length to 46 bytes. The final field is the Frame check sequence (FCS) field, which comprises 4 bytes. This sequence contains a 32-bit cyclic redundancy check (CRC) value, which is created by the sending MAC and is recalculated by the receiving MAC to check for damaged frames. The FCS is generated over the DA, SA, Length/Type, and Data fields.

In one embodiment, Ethernet Frames are checked for errors using functionality built into PHY chips 40 and 42. For instance, in one operational mode an RX_DV (received data valid) signal is asserted when an Am79C874 Ethernet is presenting recovered nibbles on its MII receive data lines. In 100Base-X mode using 4B/5B encoding, bit patterns corresponding to "/J/K" are used to define the starting point for a data stream and are considered part of the preamble; thus RX_DV is asserted when "/J/K" is detected. When an error is detected during frame reception, an RX_ER (receive error) signal is asserted.

In general, error-rate data derived from the RX_DV and RX_ER signals is used to determine when the FSO link is operating in a marginal or non-marginal (i.e., proper) state. In accordance with one embodiment, various error-rate data are stored in banks of registers 66 provided by FPGA 44. In general, registers 66 are used to store counter information corresponding to data received over MII channels 0 and 1. In one embodiment, the values are stored in two banks of registers, wherein one bank accumulates link information while the other bank can be read and cleared by software. The registers corresponding to MII channel 0 contain count data pertaining to data received via the FSO link. The registers corresponding to MII channel 1 contain count data pertaining to data received from the customer network that is to be transmitted over the FSO link.

In general, registers 66 may be used to store various error/data count measurements that are tracked on a pair-wise basis, per channel. For example, tracked data may include OK_P_NIB and BAD_P_NIB values, which respectively corresponding to the total number of nibbles in OK data packets (i.e., Ethernet frames that are received without errors, as indicated by lack of an RX_ER assertion when receiving the frame) and the total nibbles received in bad data packets (i.e., Ethernet frames having one or more errors, as identified by assertion of at least one RX_ER signal during reception of the frame). Total OK "idle" nibbles (OK_IDLE) and total bad idle nibbles (BAD_IDLE) may also be tracked in a similar manner. In this instance, idle nibbles correspond to instances in which the link is operating in an IDLE mode. Similarly, total OK nibbles (OK_NIB) and bad nibbles (BAD_NIB) may be tracked, wherein OK_NIB comprises an aggregation of OK_P_NIB+ OK_IDLE values, and BAD_NIB comprises an aggregation of BAD_P_NIB and BAD_IDLE values. In addition to calculating error-rates at the bit level, error rates may also be calculated at the packet (i.e., Ethernet frame) level. For example, the total number of OK packets (OK_PACK) and bad packets (BAD_PACK) may be tracked.

Figures 6A, 6B:
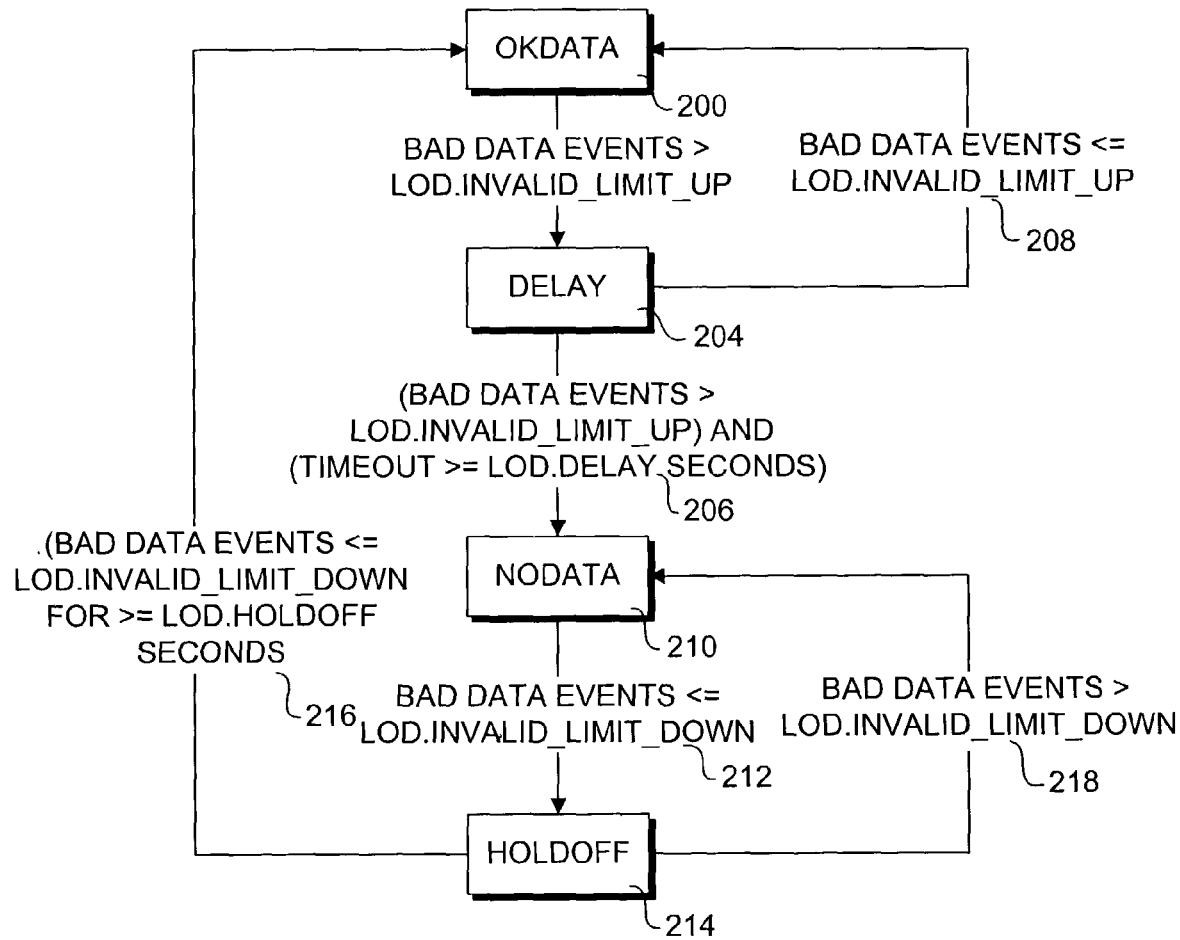
FIG. 6A is a state diagram corresponding to a loss of data (LOD) state machine algorithm implemented by a field-programmable gate array (FPGA) on the DSP board of FIG. 4.
FIG. 6B is a state table corresponding to the state machine algorithm of FIG. 6A.

Generally, count data from any of the foregoing error/data pairs or a combination thereof may be used to determine the transmission quality of a link. In one embodiment, this is implemented by programming logic stored in the DSP or the FPGA and executed by DSP 64 corresponding to the LOD algorithm discussed above. The LOD algorithm is used to implement a state machine containing a set of states that define when to enable and disable the primary channel (FSO) link. A machine state diagram corresponding to the LOD algorithm is shown in FIG. 6A, with a corresponding state table shown in FIG. 6B.

For convenience, assume the initial state corresponds to an OKDATA state 200. In accordance with this state, the FSO link is "up," which requires that the FSO-side PHY chips 40 and Network-side PHY chips 42 are enabled (ON). During processing of the LOD algorithm, a remote monitoring (RMON) function 68 is called to retrieve data stored in registers 66 and calculate an error rate value referred to herein as BAD DATA EVENTS. In general, the BAD DATA EVENTS value may be derived from data contained in one or more registers 66 for each of MII channels 0 and 1. For example, BAD DATA EVENTS may comprise the ratio of BAD_NIB/OK_NIB or the ratio of BAD_PACK/OK_PACK. Furthermore, since the state of the state machine is recalculated periodically (e.g., every second), an error rate may be determined by simply looking at the count for an error-count register, such as BAD_P_NIB, BAD_NIB, etc.

In general, the BAD DATA EVENTS value will be compared with a predefined threshold (LOD.INVALID_LIMIT_DATA) that is pertinent to the type of calculation used to determine the BAD DATA EVENTS value. For example, if an error ratio is used, such as BAD_NIB/OK_NIB, the value of LOD.INVALID_LIMIT_UP will range from 0-1. For instance, if a marginal link condition is defined to be whenever the ratio of bad-to-good nibbles (BAD_NIB/OK_NIB) exceeds 5%, the LOD.INVALID_LIMIT_UP value will be 0.05. Of course, a percentage of bad nibbles or packets received may be calculated by simple dividing the bad nibble or packet value by the good nibble or packet value plus the bad nibble or packet value (e.g., BAD_NIB/(BAD_NIB+OK_NIB) will yield the percentage of bad nibbles received). In contrast, when a single value is used for the error rate, such as the number of bad packets in the last interval or last n intervals, the threshold value will be greater than 1. For example, if the marginal operation threshold is set at n bad packets per time interval, LOD.INVALID_LIMIT_UP will equal n.

In accordance with a state condition evaluation 202, a determination is made to whether BAD_DATA EVENTS value exceeds the LOD.INVALID_LIMIT_UP threshold. If this evaluation returns a TRUE result, the state is advanced to a DELAY state 204; otherwise, the state remains at OKDATA state 200.

Figure 7:
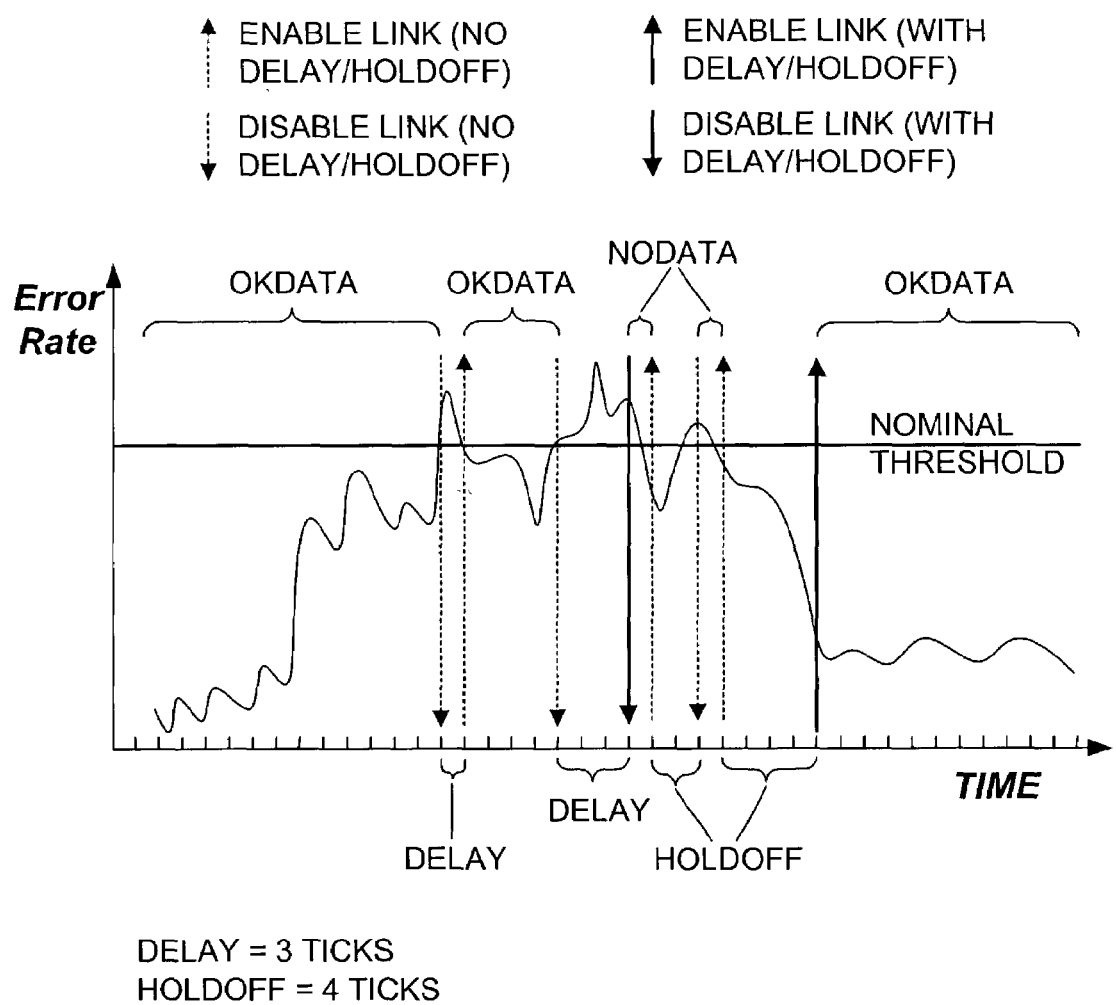
FIG. 7 is a graph illustrating a rapid-fluctuating link error rate corresponding to an FSO link operating under a marginal operating state.

At this point, there are two state condition evaluations made at each interval: a state condition evaluation 206 and a state condition evaluation 208. Under state condition evaluation 206, a determination is made to whether (BAD DATA EVENTS>LOD.INVALID_LIMIT_UP) and (TIMEOUT>=LOD.DELAY SECONDS). This evaluation introduces a new measurement parameter (TIMEOUT), and a new threshold parameter (LOD.DELAY). The LOD.DELAY and a LOD.HOLDOFF (see below) parameters corresponds to configurable delays that are used to prevent network flapping. For instance, due to the nature of FSO links, various atmospheric conditions may produce rapidly-fluctuating error rates, such as shown in FIG. 7. If an algorithm was used that generated a link changeover event (i.e., enabling and disabling the link) in response to a real-time error-rate crossing a nominal marginal/non-marginal error-rate threshold and the link operating condition was near the marginal/non-marginal threshold, numerous changeover events would result, as shown in FIG. 7. In response to each of these changeover events, the network would attempt to reconfigure its routing information, which may introduce a network flapping condition, wherein a substantial portion of the network's bandwidth being used for sending constantly changing network routing configuration information, thereby reducing the amount of bandwidth available for customer traffic. The configurable delays are used to reduce or prevent network flapping by introducing a delay between when a changeover condition is detected (i.e., a change from a non-marginal-to-marginal link condition or a change from a marginal-to-non-marginal link condition based on error-rate alone), and when a corresponding changeover event (i.e., enabling or disabling the link) may be implemented. Furthermore, in addition to the delay aspect, the algorithm uses the delay to verify the changeover condition is true throughout the length of the delay. The end result is that, depending on the length of the delays, the fluctuating error-rate may not produce any actual changeover events.

In response to entering DELAY state 204, a TIMEOUT counter is started. The value of the counter is evaluated against the LOD.DELAY configurable delay value during each state interval. Since both conditions of state condition evaluation 206 have to return a TRUE result, the state may not advance to a NODATA state 210 until the delay defined by LOD.DELAY has expired. Furthermore, as provided by state condition evaluation 208, if the BAD DATA EVENTS value falls below the LOD.INVALID_LIMIT_UP during any interval prior to the completion of the delay, the state returns to OKDATA state 200. In accordance with the combination of this logic, the only way for the state to advance to NODATA state 210 is for the LOD.INVALID_LIMIT_UP error rate threshold to be exceeded for a period that is at least as long as the LOD.DELAY value.

In response to entering the NODATA state, the Network side PHY chip (42) is disabled. In one embodiment this is performed by programming the chip via the MDIO interface to disable its transmit operation. This results in "opening" the link, causing a result similar to if a network cable was disconnected. In general, such a "loss of sync" condition will be immediately detected by any network devices directly connected to the link. As discussed above, in response to the detection of such a condition, the network equipment will automatically reroute traffic along alternate transfer paths that do not include the disabled link. In one embodiment, the Network side PHY chip on the other end of the link may also be disabled, via either automatic detection or via programming the chip using the MDIO interface. For example, when an Am79C874 Ethernet transceiver chip is operating in its 100BASE-TX mode and detects no signal or an invalid signal on its receive pair, its built-in link monitor will enter a "link fail" state.

Also in response to entering the NODATA state, test traffic 38 begins to be transmitted over the FSO link, and link quality data are gathered in a manner similar to that which occurs when customer traffic is being transmitted over the FSO link. In one embodiment, the test traffic comprise an IDLE pattern (scrambled idle code) transmitted over the FSO link. In another embodiment, the test traffic may comprise a predetermined sequence of bits and/or Ethernet frames that are transmitted over the link. In still another embodiment, the test traffic may comprise a sequence of bits and/or Ethernet frames that are dynamically-generated via an algorithm, such as a random number sequence generator.

Also in a similar manner to that described above, a state condition evaluation 212 is performed to determined if the BAD DATA EVENTS value is less than or equal to an LOD.INVALID_LIMIT_DOWN threshold. Depending on the particular error-rate data used, the values for the LOD.INVALID_LIMIT_DOWN threshold may be the same as the value for LOD.INVALID_LIMIT_UP threshold, or these values may differ. In cases where the same value is used, a single register may be used to store the value. If the condition evaluates to TRUE, the state advances to a HOLDOFF state 214; otherwise, the state remains at NODATA state 210.

HOLDOFF state 214 operates in a manner similar to DELAY state 204, but in this instance the delay is incurred prior to re-enabling the link. As with DELAY state 204, there are two state condition evaluations performed during each interval while in HOLDOFF state 214. Under a state condition evaluation 216, a determination is made to whether the BAD DATA EVENTS have been less than or equal to the LOD.INVALID_LIMIT_DOWN threshold for at least LOD.HOLDOFF_SEC. If the condition is TRUE, the state returns to OKDATA state 200. If not, the state remains at HOLDOFF state 214. During the same interval, a determination is made to whether the BAD DATA EVENTS value exceeds the LOD.INVALID_LIMIT_DOWN threshold. If this condition exists, the state is returned to NODATA state 210.

As depicted in FIG. 4, the various values for LOD.INVALID_LIMIT_DATA, LOD.INVALID_LIMIT_DOWN, LOD. DELAY_SEC and LOD.HOLDOFF_SEC and the TIMEOUT count may be stored in registers or the like in DSP 64, as depicted by registers 70.

As discussed above, the operation of the LOD state machine implements a delay between when a changeover condition is first detected, and when the actual changeover event occurs. Furthermore, by using configurable timer limits and error-rate threshold values, various network links may be tuned to obtain enhanced network performance. In one embodiment, in response to a changeover event, link status data is sent from DSP board 32 to one or more connected devices. For example, link state data 72 may be sent to a Transceiver Management Unit (TMU) 74 that is used to manage the operation of a respective Transceiver head 20 or 22, as depicted in FIGS. 1A and 1B. The TMU (and/or other optional components) may use the link status data for various purposes, such as storing historical link availability data.

As an option to or in addition to opening and closing a link, alternate means may be used effectuate routing of customer traffic along alternate paths and back to the primary channel link. For example, in accordance with one embodiment, either of DSP board 32 or TMU 74 may be linked in communication with a network device to enable the system to provide link configuration information 76 to the network device corresponding to the link's current operating state. Suppose the FSO link has been down and it is re-enabled. In response to this changeover event, link configuration information, is sent to applicable network devices, such as routers, to update the network's routing table information. For instance, the link configuration information might include the bandwidth of the FSO link, or might comprise a link cost value for the link. In this manner, when a link is re-enabled the network is immediately apprised not only of its operating state, but its current bandwidth as well, without requiring the network to interrogate the link to determine its bandwidth or perform performance metrics to ascertain its bandwidth.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. A method for effectuating routing of customer traffic from a first node to a second node on a network, wherein the customer traffic may be routed from the first to the second node along at least two transfer paths including a transfer path comprising a primary channel link, the method comprising:

(a) enabling customer traffic to be transferred over the primary channel link while monitoring a transmission quality of the primary channel link to determine if the link enters a marginal operating state, and in response thereto, (b) disabling the primary channel link such that the network immediately determines that it is unavailable for transmitting customer traffic; and (c) sending test traffic over the primary channel link while monitoring the transmission quality to determine if the primary channel link returns to a non-marginal operating state, and in response thereto, (d) re-enabling the primary channel link such that the network immediately determines that it is available for transmission of customer traffic; and (e) repeating operations (a)-(d) on a continuous basis;

wherein a change in the transmission quality between marginal and non-marginal operating states comprises a changeover condition and disabling and re-enabling the primary channel link comprise respective changeover events, further comprising implementing a configurable delay between a changeover condition and when an associated changeover event may occur; and wherein a state machine algorithm is used to determine when to disable and re enable the primary channel link.

2. A method for sending customer data from a first network node to a second network node, comprising:

(a) providing a primary channel comprising a free space optical (FSO) link enabled by respective FSO transceivers operatively-linked to the first and second network nodes;

(b) enabling customer data to be transferred over the primary channel while monitoring a transmission quality of the FSO link to determine if the link enters a marginal operating state, and in response thereto, (c) opening the FSO link so that it is unavailable for customer data; and (d) sending test traffic over the FSO link while monitoring the transmission quality to determine if the FSO link returns to a non-marginal operating state, and in response thereto, (e) closing the FSO link so that it is made available for customer data; and (f) repeating operations (b)-(e) on a continuous basis;

wherein a state machine algorithm is used to determine when to open and close the primary channel link.

3. A free space optical (FSO) system, comprising:

first and second FSO transceivers, to exchange communications traffic via a FSO link, respective first and second link monitor and control components operatively coupled to the first and second FSO transceivers, each link monitor and control component providing a network-side interface to enable connection of the FSO link to a network and configured to perform the operations of:

(a) enabling customer traffic to be transferred over the FSO link while monitoring a transmission quality of the FSO link to determine if the link enters a marginal operating state, and in response thereto, (b) disabling the FSO link such that a network to which the FSO link may be connected immediately determines that it is unavailable for transmitting customer traffic; and (c) sending test traffic over the FSO link while monitoring the transmission quality to determine if the FSO link returns to a non-marginal operating state, and in response thereto, (d) re-enabling the FSO link such that the network immediately determines that it is available for transmission of customer traffic; and (e) repeating operations (a)-(d) on a continuous basis;

wherein the link monitoring and control component includes a processing means by which an algorithm is executed to enable operations (a)-(d).

* * * * *